UNITED STATES PATENT OFFICE.

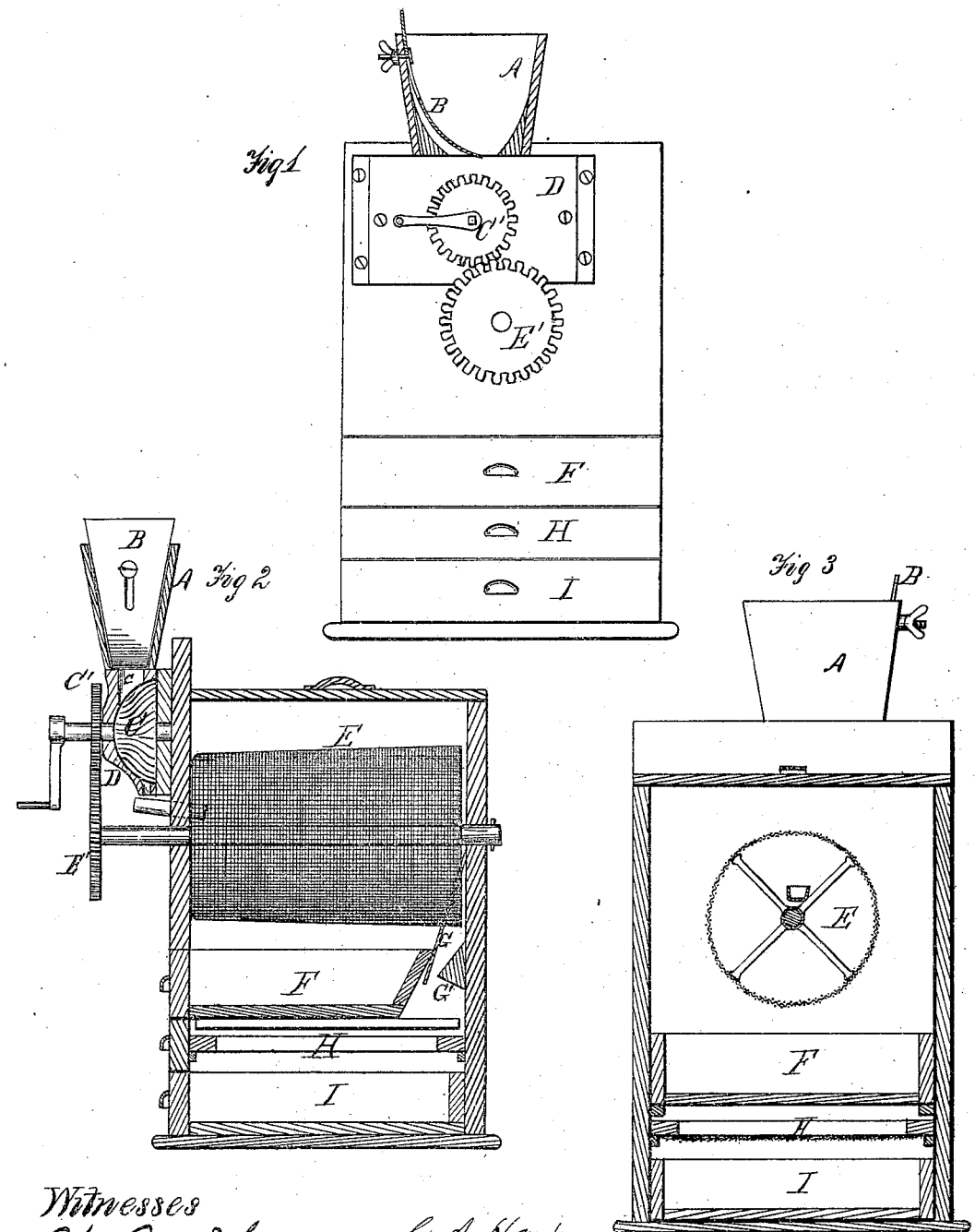

CHARLES A. HARPER, OF BURLINGTON, NEW JERSEY.

IMPROVEMENT IN FLOUR-BOLTS.

Specification forming part of Letters Patent No. 136,508, dated March 4, 1873.

*To all whom it may concern:*

Be it known that I, CHARLES A. HARPER, residing at Burlington, in the county of Burlington and State of New Jersey, have invented certain Improvements in Flour-Mills, of which the following is a specification:

This invention relates to that class of flour-mills intended for family use, in which the grain is first ground and then bolted. My improvement consists in such an arrangement of parts as will cause the tailings to fall from the bolting-reel upon a sieve which is used to separate the coarse bran from the middlings.

Figure 1 is a sectional end elevation of my improved flour-mill. Fig. 2 is a vertical longitudinal section. Fig. 3 is a vertical transverse section.

The same letters of reference are employed in all the figures in the designation of identical parts.

The grain is fed from the hopper A, the throat of which is controlled by an adjustable slide or gate, B, between the grinding-surfaces of the hemispherical runner C and corresponding concavity of the case D. The shaft of the runner carries a crank, by which to turn it, and a spur-wheel, C', which meshes into and drives the spur-wheel E' upon the shaft of the bolting-reel E. The ground meal passes through the chute c from the mill into the bolting-reel, which separates the flour from the coarse bran and middlings; the former, sifting through the bolting-cloth, falls into the drawer F, while the latter are discharged from the tail end of the reel, which projects some distance beyond the end of the drawer F, behind a guard, G, upon a deflector, G', and fall upon a sieve, H. The latter slides upon cleats in the case which contains the reel and drawers, and when the mill is in operation should be shaken now and then to separate the middlings from the bran; the former, passing through the sieve, are caught in the drawer I beneath. The guard G extends entirely across the case, and is at its upper edge in contact with the rear side thereof, and projects with its lower portion below the upper edge of the drawer F, which, when inserted properly, abuts against it, as shown in Fig. 2. The guard partly embraces the reel, being neatly fitted thereto. Thus no flour can escape behind the drawer F.

I am aware that it is not new, broadly, to use, in flour-bolts, a series of sieves or reels, and this I do not intend to claim, but mean to confine myself to the peculiar combination hereinafter set forth, as especially adapted to family flour-mills.

What I claim as my invention, and desire to secure by Letters Patent, is—

1. The combination, with the drawer or receptacle F and bolting-reel E overhanging its rear end, of the sieve H and drawer I, substantially as and for the purpose specified.

2. The elements enumerated in the preceding claim, in combination with the guard G, substantially as and for the purpose specified.

In testimony whereof I have signed my name to this specification in the presence of two subscribing witnesses.

CHARLES A. HARPER.

Witnesses:
JOSEPH L. POWELL,
JONATHAN GILBERT.